United States Patent [19]

Todt et al.

[11] 4,152,937
[45] May 8, 1979

[54] LIQUID LEVEL SENSOR

[75] Inventors: William H. Todt, Elmira Heights; Kerwin C. Playfoot, Horseheads, both of N.Y.

[73] Assignee: Westinghouse Electric Corp., Pittsburgh, Pa.

[21] Appl. No.: 656,912

[22] Filed: Feb. 10, 1976

[51] Int. Cl.² ............................................. G01F 23/26
[52] U.S. Cl. ................................................. 73/290 R
[58] Field of Search ................. 73/290 R, 304 R, 313; 336/231, 144, 224, 225, 30

[56] References Cited

U.S. PATENT DOCUMENTS

| | | | |
|---|---|---|---|
| 521,269 | 6/1894 | Mochl | 335/255 |
| 611,601 | 10/1898 | Bergmann | 314/127 |
| 1,945,544 | 2/1934 | Conklin | 250/36 |
| 2,026,299 | 12/1935 | Boyd | 73/313 X |
| 2,297,514 | 9/1942 | Von Baeyer et al. | 336/231 X |
| 2,424,766 | 7/1947 | Miner | 73/313 X |
| 2,459,174 | 1/1949 | McFarland et al. | 336/231 X |
| 3,234,491 | 2/1966 | Baur | 336/225 X |
| 3,678,748 | 7/1972 | Dziedzic | 73/290 R |
| 3,818,759 | 6/1974 | Cremer et al. | 73/290 R |
| 3,834,234 | 9/1974 | Kobayashi et al. | 73/290 R |

FOREIGN PATENT DOCUMENTS 1538129 7/1969 Fed. Rep. of Germany .......... 336/231

*Primary Examiner*—Jerry W. Myracle
*Attorney, Agent, or Firm*—M. P. Lynch

[57] ABSTRACT

The signal non-linearity which is characteristic of the end portions of an elongated liquid metal level mutual inductance type prove is substantially eliminated by increasing the coil turns per unit length of the probe in the end portions thereby increasing the mutual inductance characteristics of the probe in the end portions.

6 Claims, 6 Drawing Figures

LIQUID LEVEL SENSOR

This application is a continuation-in-part application of Application Ser. No. 510,825, entitled "Improved Liquid Level Sensor", filed Sept. 30, 1974 and abandoned subsequent to the filing of this application.

BACKGROUND OF THE INVENTION

The use of sodium and various sodium compositions, such as NaK, in nuclear facilities necessitates a highly reliable and sensitive liquid level measuring device to monitor the level of the sodium and sodium compositions. For instance, there are requirements for liquid level probes for monitoring the liquid metal levels in vessels, tanks and closed systems in fast flux nuclear reactor test facilities.

Inductive bifilar wound coil probes for sensitive liquid levels are well known in the prior art. The construction and operation of such a device is described in copending Patent Application Ser. No. 587,792, entitled "Liquid Metal Level Sensor With Increased Sensitivity", filed June 16, 1975 now U.S. Pat. No. 3,996,801 by the assignee of the present invention. The liquid metal level mutual inductance type probe typically consists of an elongated former or support mandrel which is bifilar wound with twin lengths of insulated wire to form two closely coupled coils, one being a primary and the other a secondary, extending over the active length of the liquid metal level probe. The combination of the closely wound coil turns of primary and secondary windings is enclosed in a closed end protective tubular housing which isolates the coil turns from direct contact with liquid metal present in a liquid metal containment into which the closed end tubular housing is immersed. The primary winding is AC excited, and due to the closed coupling with the secondary winding, a signal is induced into the secondary winding. The amplitude of the induced signal is controlled by the level of the liquid metal surrounding the closed end tubular protective housing, thus forming an AC analog of the liquid metal level.

Typically, the insulated wire used to form the coil turns of the primary and secondary windings is coaxial cable in which the conductive outer sheath is brazed to the supporting metal mandrel with the center conductor of adjacent coaxial cables functioning as the primary and secondary windings. The brazing of the outer sheath establishes the desired bulk effect mode of operation of the mutual inductance type liquid level probe.

While the above-identified conventional mutual inductance type liquid level probe, which is further described and illustrated in U.S. Pat. Nos. 3,818,759 and 3,834,231, generally exhibits a linear analog output signal over a substantial center portion of the active length of the probe defined by the coil windings, these conventional mutual inductance liquid metal probes exhibit substantial nonlinearity at the end portions of the probe, wherein the end portion is typically defined as having a minimum length, as measured from the last active coil, approximating the effective diameter of the probe. While this non-linearity does not pose a significant problem in applications where the mechanical length of the probe can be of sufficient length to minimize the end effect, numerous closed loop and tank applications limit the overall length of the probe such that significant linearity of the output signal developed over the entire length of the active portion of the probe is essential.

SUMMARY OF THE INVENTION

There is disclosed herein with respect to the accompanying drawings a technique for minimizing the non-linearity characteristics of the end portions of the mutual inductance type liquid metal level sensing probes by increasing the coil turns per unit length of the probe assembly in the end portions thereby increasing the mutual inductance characteristics of the probe assembly at the end portion. Detail studies have determined that the increased mutual inductance in the end portions significantly improves the linearity of the output signal developed by the probe coil turns at the end portions.

Several typical modifications of the coil turn configurations in the end portions of the probe which are suitable for achieving the desired linearity in the end portions include, decreasing the spacing between coil turns of the primary and secondary windings in the end portions, and reducing the diameter of the insulated wire forming the coil turns of the primary and secondary windings in the end portions of the probe.

DESCRIPTION OF THE DRAWINGS

The invention will become more readily apparent from the following exemplary description in connection with the accompanying drawings.

DESCRIPTION OF THE PREFERRED EMBODIMENT

Figure 1:
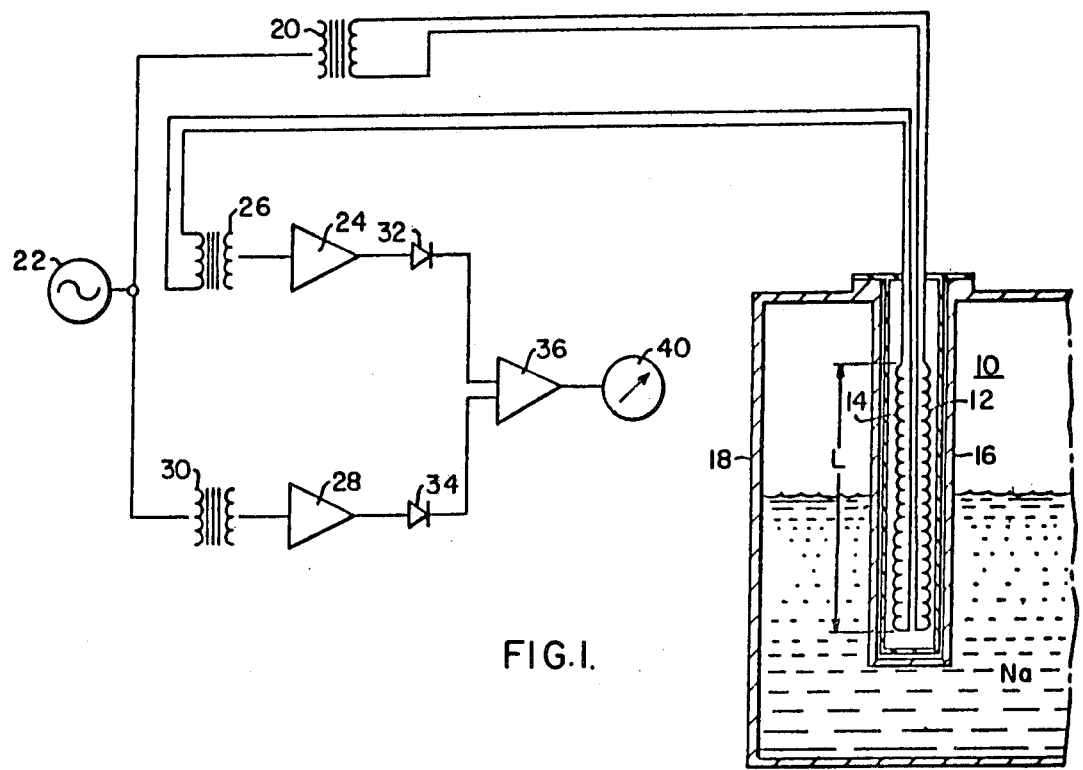
FIG. 1 is a schematic illustration of a typical liquid metal level mutual inductance probe.

Referring to FIG. 1, there is illustrated a liquid metal level mutual inductance probe 10 schematically illustrated as consisting of a primary winding 12 and a secondary winding 14 in the form of an elongated probe inserted within a closed end tubular protective housing 16 of a liquid metal containment vessel 18, herein illustrated as containing sodium. Probe 10 monitors the level of the liquid metal within the containment vessel 18. The transformer 20 couples AC excitation from the AC excitation source 22 to the primary winding 12. The signals developed at the secondary winding 14 in response to the level of the liquid metal within the containment vessel 18 are coupled to amplifier 24 by transformer 26. The AC excitation is coupled to amplifier 28 by transformer 30, with the outputs from the amplifiers 24 and 28 being supplied to blocking rectifiers 32 and 34, respectively, and supplied as inputs to differential amplifier 36. The output signal developed by differential amplifier 36, which corresponds to the difference between the AC excitation signal and the signal developed by the secondary winding 14, is representative of the level of the liquid metal in the containment vessel 18, and is supplied to a liquid metal level indicator 40.

Figure 2:
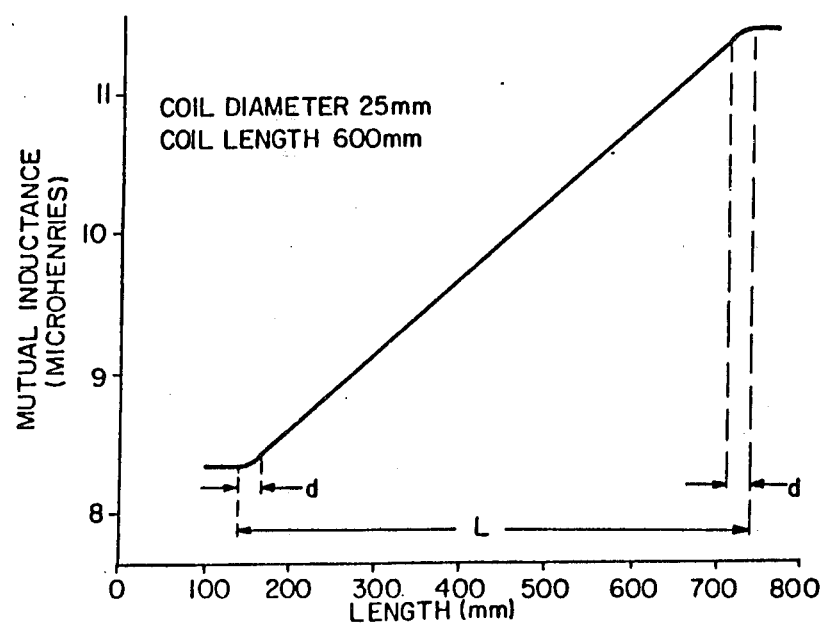
FIG. 2 is an illustration of the linearity characteristics of the conventional liquid metal level mutual inductance type probe.
Figure 3:
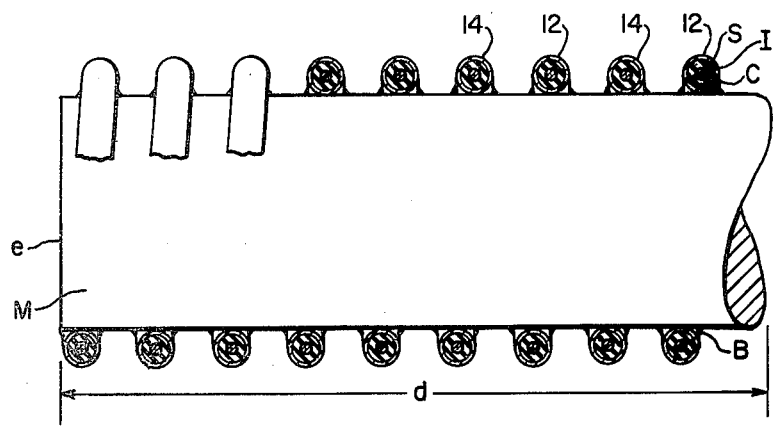
FIG. 3 is an illustration of the Prior Art bifilar windings of the primary and secondary coil turns for a liquid metal level mutual inductance type probe.

There is illustrated in FIG. 2, a curve reflecting the linearity characteristics of the traditional prior art analog liquid metal mutual inductance type probe such as that illustrated in FIG. 3.

The prior art liquid metal level mutual inductance probe illustrated in FIG. 3 typically consists of uniformly spaced coil turns of primary winding 12 and secondary winding 14 wound in a bifilar arrangement in tight contact with a supporting mandrel M. The insulated wire typically used for the primary winding 12 and the secondary winding 14 consists of a coaxial cable having an inner conductor C, surrounded by insulation I and an outer conductive sheath S. As described above, a brazing material B is typically employed to braze the outer sheaths S to the mandrel M with the central conductors C of the bifilar wound pair of coaxial cables forming the electrical conductors of the primary winding 12 and the secondary winding 14.

The uniformly spaced, uniform diameter bifilar wound primary and secondary windings 12 and 14, respectively, of the Prior Art, as illustrated in FIG. 3, results in a liquid metal level mutual inductance probe which generates a liquid metal level indicating output signal having linearity characteristics as typically illustrated in FIG. 2. Assuming that the bifilar wound primary and secondary windings 12 and 14, respectively, define an active probe length L, desired signal linearity from the probe is limited to that portion of the active length corresponding to L-2d, where d corresponds to an end portion of the active length of the probe and corresponds in length to a dimension at least equal to the effective diameter of the probe as measured from the last active coil at either end.

Detailed experimentation with variations in the coil configurations at the end portions of the probe has indicated that an increase in the mutual inductance characteristics of the probe in the end portions d can significantly improve the linearity characteristics of the output signals developed at the end portions d. A suitable technique for providing increased mutual inductance at the end portions d consists of providing a greater number of coil turns per unit length of the primary and secondary windings 12 and 14, respectively in the end portions d as compared to the coil turns per unit length of the primary and secondary windings in the central portion of the probe defined as L-2d.

Figure 4:
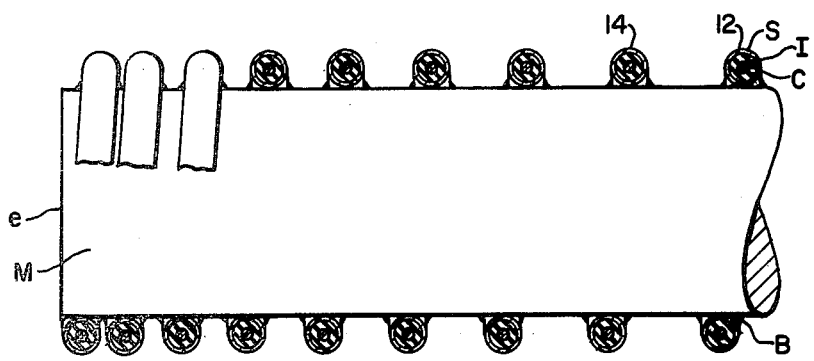
FIGS. 4, 5 and 6 are illustrations of variations in the coil turns of the primary and secondary windings in the end portion of a liquid metal level mutual inductance type probe to improve the linearity characteristics of the signal developed in the end portions.
Figure 5:
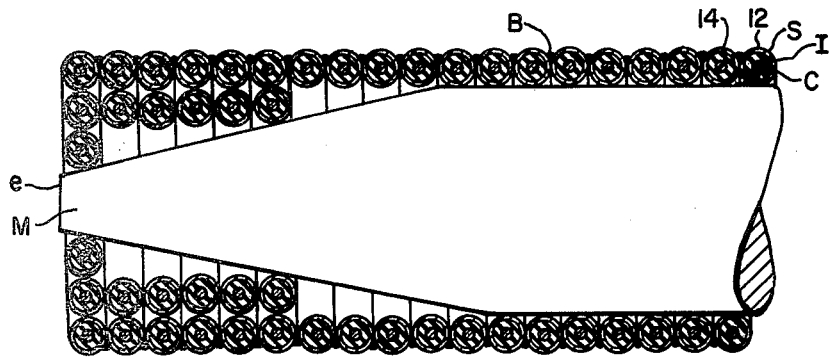
Figure 6:
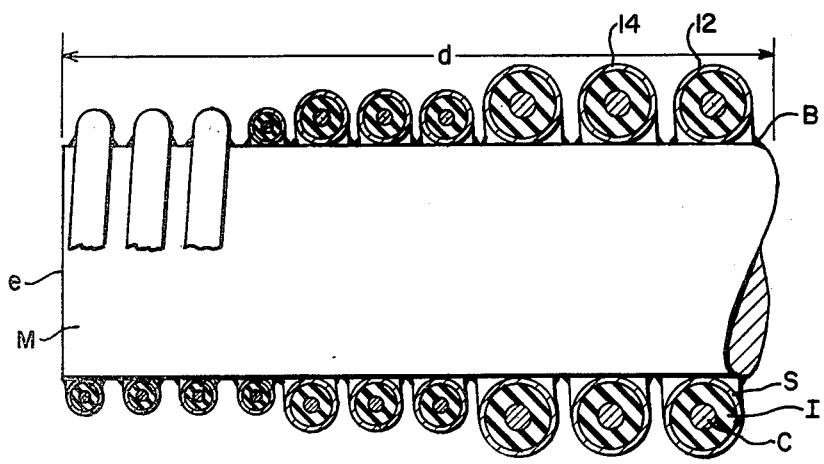

Several techniques for providing the desired increased mutual inductance characteristics in the end portions d are illustrated in FIGS. 4, 5 and 6. While these illustrations are limited to depicting changes in coil geometry at one end of the active portion of an elongated liquid metal level mutual inductance probe, it is apparent that the same variations in coil arrangements can be provided at the opposite end when and if it is necessary to provide improved linearity at both ends of the probe.

The coil configuration illustrated in FIG. 4 consists of progressively decreasing the spacing of adjacent coil turns of the bifilar wound primary and secondary windings 12 and 14, respectively, in the end portion d of the probe 10 to a minimum spacing at the end e of the active portion of the probe 10. The progressively decreasing spacing between adjacent coil turns of the bifilar wound primary and secondary windings 12 and 14 of FIG. 4 will result in an increase in the signal response of the end portion d inasmuch as the mutual inductance is dependent on the number of coil turns per unit length. This increased sensitivity of the end portion d will improve the linearity characteristics of the end portion d thereby providing desired linearity characteristics over the entire active length L of the probe.

In the embodiment of FIG. 5, the elongated support mandrel M is tapered at the end portion d to accommodate additional layers of coil turns of the primary and secondary windings to be progressively built up to a level corresponding to a probe diameter suitable for inserting within the closed end tubular protective housing 16 of FIG. 1. This technique for increasing the coil turns per unit length of the probe 10 in the end portion d beyond the coil turns per unit length in the central portion of the probe provides the desired increase in mutual inductance and corresponding linearity in the end portion d.

Yet another technique for increasing the coil turns per unit length in the end portion d of the probe 10 is illustrated in FIG. 6. The embodiment illustrated in FIG. 6 utilizes coaxial cables of varying diameters, with the coaxial cables forming the coil turns in the end portion d having a diameter less than the diameter of the coaxial cables forming the coil turns in the central portion of the probe. The use of coaxial cable of lesser diameter to provide the primary winding 12 and secondary winding 14 in the end portion d permits a greater number of coil turns per unit length at the end portion of the probe thereby improving the linearity characteristics of the end portion of the probe. While the illustration at FIG. 6 depicts the use of a uniform diameter coaxial cable for the end portion d, it is apparent that coaxial cable of progressively decreasing diameter can be used in the end portion d to achieve a more controlled variation in the linearity characteristic of the end portion d.

Furthermore, while the use of the modified coil configurations illustrated in FIGS. 4, 5 and 6 depicts distinct techniques for achieving improved end portion linearity characteristics for an elongated liquid metal level mutual inductance type probe, it is apparent that two or more of the techniques illustrated in FIGS. 4, 5 and 6 could be combined in a single probe to achieve desired linearity improvement.

We claim:

1. In a liquid metal level containment system, a combination of, a container and liquid metal therein, a closed end tubular protective housing extending into the liquid metal and a continuous elongated liquid metal level mutual inductance probe to provide a continuous, substantially linear liquid metal level indication, said probe having a continuous primary winding and a continuous secondary winding wound coextensively about the longitudinal axis of said closed end tubular protective housing, said coextensively wound primary and secondary windings being inserted in the closed end tubular protective housing and isolated from direct contact with the liquid metal contacting the closed end tubular protective housing, the primary and secondary windings of the elongated liquid metal level mutual inductance probe consisting of multiple coil turns, changes in mutual inductance occuring in response to changes in the level of the liquid metal producing an output signal from said secondary winding indicative of the level of liquid metal in said containment, the coil turns per unit length of said coextensively wound primary and secondary windings at either or both ends of said elongated liquid metal level mutual inductance probe progressively increasing over an end portion of said probe toward the end of said probe, the number of coil turns per unit length in said end portion being greater than the coil turns per unit length in the remaining portion of said elongated liquid metal level mutual inductance probe.

2. The combination of claim 1 wherein said end portion of said probe has a minimum length corresponding substantially to the effective diameter of said probe.

3. The combination of claim 2 wherein said primary and secondary windings are comprised of coaxial cable, the spacing between coil turns of said primary and secondary windings in said end portion being less than the spacing between coil turns of the primary and secondary windings in the remaining portion of said probe to increase the coil turns per unit length in said end portion thereby increasing the mutual inductance characteristics of said end portion.

4. The combination of claim 2 wherein said primary and secondary windings are comprised of coaxial cable, the diameter of the coaxial cable comprising said primary and secondary windings in said end portion being less than the diameter of the coaxial cable comprising the primary and secondary windings in the remaining portion of said probe.

5. The combination of claim 1 wherein said elongated liquid metal level mutual inductance probe includes an elongated support mandrel about which are wound said primary and secondary windings, the end of said elongated support mandrel closest to said closed end of said closed end tubular protective housing being inwardly tapered, a greater number of coil turns per unit length of said primary and secondary windings being wound on the inwardly tapered portion of said support mandrel than on the remaining portion of the support mandrel.

6. A method for improving the linearity characteristics of an end portion of an elongated liquid metal level mutual inductance probe comprising primary and secondary coil windings wound coaxially and coextensively in an elongated configuration and being inserted within a closed end tubular protective housing immersed in a liquid metal wherein said probe develops an output signal in response to the magnitude of the mutual inductance related to the level of said liquid metal, comprising the step of, winding a progressively greater number of coil turns per unit length of said coaxially and coextensively wound primary and secondary coil windings in the end portion of said elongated liquid metal level mutual inductance probe nearest the closed end of said closed end protective housing, the number of coil turns per unit length in said end portion being greater than the number of coil turns in the remaining portion of said probe to increase the mutual inductance characteristics of the end portion of said probe closest to said closed end.

* * * * *